US012810469B2

(12) United States Patent
McClintock et al.

(10) Patent No.: US 12,810,469 B2
(45) Date of Patent: Nov. 24, 2026

(54) THERMAL IMAGE-BASED POSE TRACKING TO MATE CONNECTORS OF VEHICLES

(71) Applicant: THE BOEING COMPANY, Arlington, VA (US)

(72) Inventors: Ryan P. McClintock, Brentwood, MO (US); Caleb G. Price, Brentwood, MO (US); Christian Louis Carini, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 264 days.

(21) Appl. No.: 18/807,262

(22) Filed: Aug. 16, 2024

(65) Prior Publication Data

US 2025/0356528 A1 Nov. 20, 2025

Related U.S. Application Data

(60) Provisional application No. 63/649,583, filed on May 20, 2024.

(51) Int. Cl.

| | |
|---|---|
| ***G06T 7/73*** | (2017.01) |
| ***G01J 5/00*** | (2022.01) |
| ***G01J 5/03*** | (2022.01) |
| ***G06T 7/13*** | (2017.01) |
| ***G06T 17/20*** | (2006.01) |
| ***H04N 23/23*** | (2023.01) |

(52) U.S. Cl.

CPC .............. *G06T 7/75* (2017.01); *G01J 5/0022* (2013.01); *G01J 5/03* (2022.01); *G06T 7/13* (2017.01); *G06T 17/20* (2013.01); *H04N 23/23* (2023.01); *G01J 2005/0077* (2013.01); *G06T 2207/10048* (2013.01); *G06T 2207/30252* (2013.01)

(58) Field of Classification Search

CPC .. G06T 7/75; G06T 7/13; G06T 17/20; G06T 2207/10048; G06T 2207/30252; G01J 5/0022; G01J 5/03; G01J 2005/0077; H04N 23/23

See application file for complete search history.

(56) References Cited

U.S. PATENT DOCUMENTS

| | | | | |
|---|---|---|---|---|
| 7,562,847 | B2 | 7/2009 | Jones | |
| 10,930,041 | B2 * | 2/2021 | Black | B64D 39/06 |
| 2004/0083018 | A1 * | 4/2004 | Dollevoet | B65H 39/16 700/109 |
| 2016/0116289 | A1 * | 4/2016 | Friend | G01S 19/393 701/518 |
| 2016/0295208 | A1 * | 10/2016 | Beall | G06K 7/10297 |
| 2017/0052070 | A1 * | 2/2017 | Marsh | G01D 5/347 |
| 2025/0208613 | A1 * | 6/2025 | Obata | G01J 5/48 |

* cited by examiner

*Primary Examiner* — John B Strege
(74) *Attorney, Agent, or Firm* — Moore IP Law

(57) ABSTRACT

A device includes a thermal imaging sensor configured to generate thermal image data depicting at least a portion of an object. The device also includes a vision processor coupled to the thermal imaging sensor. The vision processor is configured to generate outline image data corresponding to a modeled outline of the object based on a model of the object and a pose estimate of the object. The vision processor is also configured to determine an overlap value indicating an amount of overlap between the modeled outline and gradient data associated with the thermal image data, and to adjust the pose estimate of the object based on the overlap value.

20 Claims, 10 Drawing Sheets

THERMAL IMAGE-BASED POSE TRACKING TO MATE CONNECTORS OF VEHICLES

CROSS-REFERENCE TO RELATED APPLICATIONS

The present application claims the benefit of U.S. Provisional Patent Application No. 63/649,583 entitled "THERMAL IMAGE-BASED POSE TRACKING TO MATE CONNECTORS OF VEHICLES," filed May 20, 2024, the contents of which are incorporated herein by reference in their entirety.

FIELD OF THE DISCLOSURE

The present disclosure is generally related to thermal image-based pose tracking to mate connectors of vehicles.

BACKGROUND

Highly skilled human operators are typically used to guide complex, high-speed docking operations, such as air-to-air refueling and spacecraft docking operations. As such, the operations rely heavily on human judgment, which is sometimes supplemented by computer vision techniques. To illustrate, complex stereoscopic vision systems may be used to aid the human operator in mating connectors (e.g., a receiver and refueling boom or docking connectors). These docking operations can be complex and involve precision maneuvers, making such operations difficult to extend to autonomous vehicles such as drones, drone aircraft, or autonomous spacecraft. Additionally, artificial intelligence-based solutions can be challenging to test, resulting in difficulty certifying such systems with industry organizations or governments.

SUMMARY

In a particular implementation, a device includes a thermal imaging sensor configured to generate thermal image data depicting at least a portion of an object. The device also includes a vision processor coupled to the thermal imaging sensor, the vision processor is configured to generate outline image data corresponding to a modeled outline of the object based on a model of the object and a pose estimate of the object. The vision processor is configured to determine an overlap value indicating an amount of overlap between the modeled outline and gradient data associated with the thermal image data. The vision processor is also configured to adjust the pose estimate of the object based on the overlap value.

In another particular implementation, a method includes generating outline image data corresponding to a modeled outline of an object based on a model of the object and a pose estimate of the object. The method includes determining an overlap value indicating an amount of overlap between the modeled outline and gradient data associated with thermal image data depicting at least a portion of the object. The method also includes adjusting the pose estimate of the object based on the overlap value.

In another particular implementation, a non-transitory, computer-readable medium stores instructions that, when executed by one or more processors, cause the one or more processors to perform operations including generating outline image data corresponding to a modeled outline of an object based on a model of the object and a pose estimate of the object. The operations include determining an overlap value indicating an amount of overlap between the modeled outline and gradient data associated with thermal image data depicting at least a portion of the object. The operations also include adjusting the pose estimate of the object based on the overlap value.

The features, functions, and advantages described herein can be achieved independently in various implementations or may be combined in yet other implementations, further details of which can be found with reference to the following description and drawings.

DETAILED DESCRIPTION

Figure 1:
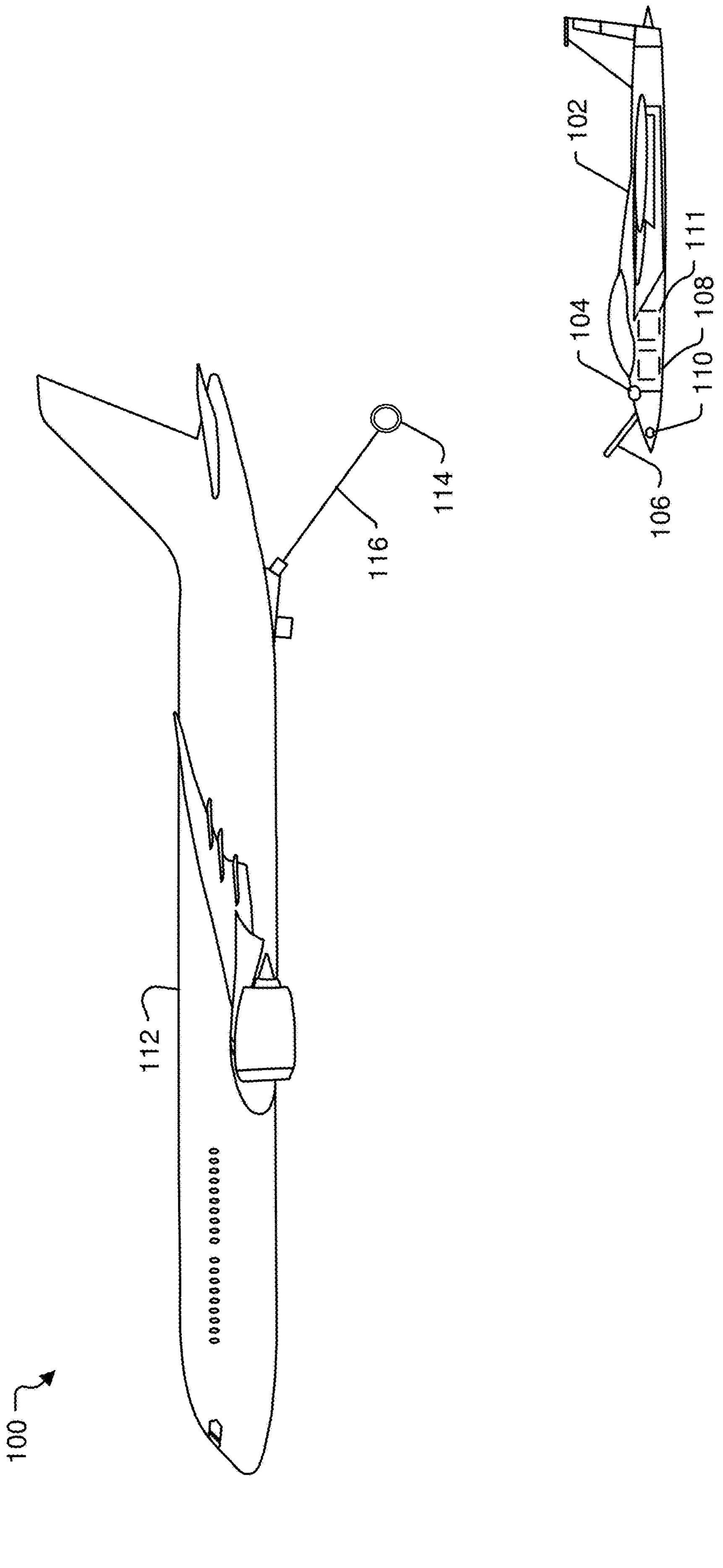
FIG. 1 is a diagram that illustrates an example of a system configured to perform thermal image-based pose tracking to mate connectors of vehicles.

Aspects disclosed herein present systems and methods of thermal image-based pose tracking to mate connectors of vehicles. For example, a vision processor that resides onboard a first aircraft can process thermal image data from a thermal imaging sensor, such as an infrared camera, to identify and track a second aircraft depicted in the thermal image data. The first aircraft includes a drone aircraft, another type of autonomous aircraft or spacecraft, or a semi-autonomous aircraft or spacecraft that implements an autonomous aerial refueling receive (A2R2) capability or autonomous docking capability, and the second aircraft includes another aircraft or spacecraft, such as a refueling tanker, that includes a second connector with which a first connector of the first aircraft is configured to mate. The second aircraft can be an autonomous aircraft or spacecraft, a semi-autonomous aircraft or spacecraft, or a manually piloted aircraft or spacecraft. In implementations described herein, the first connector includes a probe, a fuel receptacle, a docking appendage, or the like, and the second connector includes a drogue, a drogue basket, a refueling boom, a docking clamp or receptacle, or the like. In some implementations, the vision processor outputs a pose estimate of the second aircraft, such as an estimated 6 degrees of freedom (6DoF) pose of the second aircraft relative to the thermal imaging sensor, to one or more other processor(s), such as a guidance processor of a navigation system, to enable the guidance processor to determine and initiate the performance of maneuvers to guide the first aircraft to mate the first connector (e.g., the probe) to the second connector (e.g., the drogue). As an example, the pose estimate output by the vision processor can enable the guidance processor to maneuver the first aircraft such that a refueling connector (e.g., the probe) is mated to a refueling port (e.g., the drogue basket) of the second aircraft during air-to-air refueling operations. As another example, the pose estimate output by the vision processor of a first spacecraft can enable the guidance processor to maneuver the first spacecraft relative to a second spacecraft such that one spacecraft is docked to another spacecraft (e.g., via mating the first and second connectors). In implementations, the vision processor is used to support the guidance processor instead of using a human operator to reduce costs, such as costs associated with training human operators and costs associated with operations to mate connectors.

In some contexts, the two aircraft performing mating (e.g., of connectors) include a primary aircraft and a secondary aircraft. Although the terms may be arbitrarily assigned in some contexts (such as where two peer aircraft are mating), generally, the primary aircraft refers to an aircraft that is connecting to the secondary aircraft to be serviced by the secondary aircraft, or the primary aircraft refers to the aircraft, onboard which the vision processor resides. To illustrate, in an air-to-air refueling context, the primary aircraft is the receiving aircraft (e.g., the aircraft to be refueled). Likewise, the secondary aircraft refers to the other aircraft of a pair of aircraft. To illustrate, in the air-to-air refueling context, the secondary aircraft is the tanker aircraft. Although predominately referred to herein as aircraft, the first aircraft and the second aircraft can also be referred to as a first device and a second device, with the term device used broadly to include an object, system, or assembly of components that is/are operated upon as a unit (e.g., in the case of the secondary device) or that operate cooperatively to achieve a task (e.g., in the case of the primary device).

In a particular aspect, the first aircraft uses a thermal imaging device (e.g., a long-wave infrared (LWIR) camera) to capture thermal images of at least a portion of the second aircraft. For example, the thermal imaging device can capture thermal images of a back portion of a refueling tanker. The vision processor performs thresholding on the thermal images to generate thresholded thermal images that include pixels having intensity values that satisfy (e.g., are greater than or equal to) a threshold. Thresholding the thermal images can reduce the number of pixels to be processed to those associated with higher temperatures than the ambient air, providing greater contrast to the second aircraft in the thermal images.

In aspects, the vision processor estimates a pose of the second aircraft based on an overlap between an outline of the second aircraft in the thermal images and an outline of a 3D model of the second aircraft, and outputs the estimated pose to another processor, such as a guidance processor, for navigation and control of the first aircraft based on the estimated pose. To illustrate, the vision processor generates outline image data corresponding to a modeled outline of the second aircraft based on the 3D model of the second aircraft and a pose estimate of the second aircraft. The vision processor also determines an overlap value indicating an amount of overlap between the modeled outline and gradient data associated with the thermal image data, which is used to detect the outline of the second aircraft in the thermal image data. The vision processor adjusts the pose estimate based on the overlap value in an iterative process to determine a pose estimate that results in a closest match between the outline of the 3D model and the outline of the second aircraft in the thermal image data.

In implementations, the vision processor includes a CPU that is coupled to a GPU and leverages the GPU architecture to perform rendering and overlap scoring. For example, the CPU sends a thresholded thermal image and model transform data associated with the pose estimate to the GPU, and the GPU generates the outline image data based on the model transform data. To illustrate, the GPU renders an image of a shadow corresponding to the second aircraft based on the 3D model and the model transform data, and converts the image of the shadow into the outline image data corresponding to the modeled outline of the second aircraft.

The GPU also determines the overlap sum and number of outline pixels. In an example, for each pixel of the modeled outline, the GPU determines a corresponding match factor based on a weighted sum of corresponding pixel values of the gradient data. The GPU generates a sum of all the match factors and a total count of the overlap pixels and sends the overlap sum and overlap pixel count to the CPU. On the CPU the sum is renormalized based on the pixel count to calculate the overlap value.

In some implementations, the CPU executes an iterative pose estimate refinement operation for each frame of the thermal image data. In each iteration, the CPU adjusts the estimated pose and sends updated model transform data to the GPU, and the GPU uses the updated model transform data to update the outline image data and determine updated overlap sum and pixel count values, which is sent to the CPU to calculate a match factor score. Multiple iterations of the iterative pose estimate refinement operation are performed for each frame of the thermal image data to determine, for each frame of the thermal image data, an estimated pose of the second aircraft that is associated with a largest amount of overlap that was generated during the iterations for that frame.

Optionally, the vision processor estimates position information of the second aircraft based on the pose estimate, position information of the first aircraft, a field of view of the thermal imaging sensor, a relative position of the thermal imaging sensor with respect to the first aircraft, or a combination thereof, and the estimated position information is provided to the guidance processor for use in determining maneuvers for the first aircraft.

One benefit of the disclosed systems and methods is that the vision processor and the thermal imaging sensor provide an all-optical, passive solution for mating connectors of vehicles during flight, such as for aerial refueling of aircraft or docking of spacecraft, which provides a high confidence solution at close range. For example, by determining a pose estimate that causes a best match between the outline of the 3D model and the outline of the aircraft in the thermal images, the vision processor described in aspects herein can identify, track, and estimate the range to the aircraft without significantly increasing the processing resources or sensors onboard an autonomous aircraft. The systems and methods disclosed herein can provide autonomous mating of connectors between aircraft in situations in which global positioning satellite (GPS)-based systems and/or inertial navigation system (INS)-based solutions are inoperable or have lower reliability, or in aircraft that do not include an onboard GPS or INS system, without significantly increasing cost or complexity of the systems onboard the autonomous or semi-autonomous aircraft. Additionally, or alternatively, the estimated pose provided by the vision processor can be combined with (e.g., by using as a safety check or verification for) other object recognition operations and/or for a GPS-based or INS-based solution to provide a holistic refueling or docking system with high reliability and confidence. Further, using vision-based maneuvering to control aircraft or spacecraft during complicated maneuvers, such as aerial refueling or docking, can reduce costs and resources as compared to training human operators to control the aircraft, as well as providing more predictable and repeatable maneuvers than using human operators.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, a system may be described herein as including one or more computing devices ("computing device(s)"), which indicates that in some implementations the system includes a single computing device and in other implementations the system includes multiple computing devices. For ease of reference herein, such features are generally introduced as "one or more" features, and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates a system 100 including several aircraft including a first aircraft 102 that is configured to support operations that identify and track a second aircraft 112 based on thermal image data, such that the first aircraft 102 can perform one or more maneuvers to mate a probe 106, also referred to as a first connector, of the first aircraft 102 with a drogue 114 (e.g., a basket), also referred to as a second connector, of the second aircraft 112. In the example illustrated in FIG. 1, the first aircraft 102 includes or corresponds to an autonomous or semi-autonomous aircraft, such as a drone or drone aircraft, an autonomous or semi-autonomous aircraft or spacecraft, or the like (a primary device, as described above), as described above, and the second aircraft 112 includes or corresponds to a fuel tanker (a secondary device, as described above). For example, the second aircraft 112 can be configured to service or support the first aircraft 102, such as providing fuel or a refueling service (e.g., an A2R2 service), and the first aircraft 102 includes a device or system configured to couple to the second aircraft 112 and possibly to be serviced by or supported by the second aircraft 112. Although described in the context of a fuel tanker and an autonomous or semi-autonomous aircraft, in other implementations, the first aircraft 102 can include other types of aircraft or spacecraft, such as a space shuttle, and the second aircraft 112 can include other types of aircraft of spacecraft, such as a space station with which the first aircraft is configured to dock.

The second aircraft 112 is coupled via a hose 116 to the drogue 114. The first aircraft 102 includes the probe 106 that is configured to couple with (e.g., physically attach to) the drogue 114. The second aircraft 112 is configured to provide fuel via the hose 116 to the first aircraft 102 while the probe 106 is coupled to the drogue 114 (e.g., an aerial refueling basket). Although the drogue 114 is illustrated in FIG. 1 as being coupled to the second aircraft 112 via the hose 116, in some other implementations, the second aircraft 112 includes a moveable coupling system configured to move the drogue 114 (or another type of connector) relative to the probe 106 (or another type of connector) of the first aircraft 102. For example, the moveable coupling system of the second aircraft 112 can include a steerable boom (e.g., a refueling boom) of a refueling system or a steerable docking arm of a docking system. The above referenced examples are merely illustrative and are not limiting. Additionally, the second aircraft 112 includes a fuel tank to supply fuel, via the hose 116 (or a refueling boom), to the first aircraft 102.

The first aircraft 102 includes a thermal imaging sensor 104. In an example, the thermal imaging sensor 104 includes a long-wave infrared (LWIR) camera or another type of infrared (IR) camera. The thermal imaging sensor 104 is configured to generate thermal image data (e.g., thermal image(s)) that depicts temperature information associated with at least a portion of the second aircraft 112, the drogue 114, or a combination thereof. In some implementations, the thermal image data represents a stream of real-time (e.g., subject to only minor video front-end processing delays and buffering) thermal image frames that represent relative temperatures and relative positions of the drogue 114 and the second aircraft 112. In a particular aspect, the thermal imaging sensor 104 is located within a housing that is coupled to a hull of the first aircraft 102 and that includes an aperture that provides a field of view for the thermal imaging sensor 104. Alternatively, the thermal imaging sensor 104 can be located at or near an end of the probe 106. In some implementations, the first aircraft 102 includes multiple thermal imaging sensors 104 positioned at one or more locations with respect to the hull and/or the probe 106.

The first aircraft 102 also includes a vision processor 108, an optional memory (not shown in FIG. 1), one or more additional processors 111, and optionally, one or more sensors 110. In the example illustrated in FIG. 1, the vision processor 108 includes or corresponds to one or more image processors, such as one or more CPUs coupled to one or more GPUs. In examples, the additional processor(s) 111 include or correspond to one or more guidance processors, one or more navigational processors, one or more processors of a flight control system, other types of processors, or a combination thereof. In some implementations, the vision processor 108 and the additional processor(s) 111 are combined. To illustrate, one or more GPUs, one or more central processing units (CPUs), one or more digital signal processors (DSPs), one or more field-programmable gate arrays (FPGAs), one or more application-specific integrated circuits (ASICs), or one or more other multi-core or multi-thread processing units may serve as either or both of the vision processor 108 and the additional processor(s) 111. Although some implementations include the memory, in other implementations, the memory is omitted from the first aircraft 102.

The sensor(s) 110, when present, are configured to generate supplemental sensor data (e.g., additional image and/or position data) indicative of relative positions of the first aircraft 102 and the second aircraft 112. For example, the sensor(s) 110 may include a camera, a video capture device, a light emitting diode (LED) device, position sensors (e.g., gyroscope(s), accelerometer(s), inertial navigation system (INS) sensors, and the like), and sensor data generated by the sensor(s) 110 can include additional image data, video data, position data, such as 6 degrees of freedom (6DoF) position data, INS data, or a combination thereof. Additionally, or in the alternative, the sensor(s) 110 may include a range finder (e.g., a laser range finder and/or a radio with ranging capability, such as a tactical radio or radio range finder), and the sensor data generated by the sensor(s) 110 can include range data (e.g., a distance from the range finder to the second aircraft 112). Additionally, or in the alternative, the sensor(s) 110 may include a radar system, and the sensor data generated by the sensor(s) 110 may include radar data (e.g., radar returns indicating a distance to the second aircraft 112, a direction to the second aircraft 112, or both). Additionally, or in the alternative, the sensor(s) 110 may include a lidar system, and the sensor data generated by the sensor(s) 110 may include lidar data (e.g., lidar returns indicating a distance to the second aircraft 112, a direction to the second aircraft 112, or both). Additionally, or in the alternative, the sensor(s) 110 may include a sonar system, and the sensor data generated by the sensor(s) 110 may include sonar data (e.g., sonar returns indicating a distance to the second aircraft 112, a direction to the second aircraft 112, or both). Additionally, or in the alternative, the sensor(s) 110 may include one or more additional cameras (e.g., in addition to the thermal imaging sensor 104), and the sensor data generated by the sensor(s) 110 may include stereoscopic image data.

During operation, the first aircraft 102 can activate the thermal imaging sensor 104 to capture thermal image data representing at least a portion of the second aircraft 112. In implementations that include the sensor(s) 110, the sensor(s) 110 capture additional sensor data associated with the second aircraft 112, the drogue 114, or both. The vision processor 108 processes the thermal image data to detect a pose estimate of the second aircraft 112, a range estimate (e.g., an estimated distance between the first aircraft 102 and the second aircraft 112 or between the probe 106 and the drogue 114), a position estimate (e.g., coordinates) of the drogue 114 or the second aircraft 112, or a combination thereof, and the vision processor 108 provides the pose estimate, the range estimate, and/or the position estimate to the additional processor(s) 111. In some implementations, the vision processor 108 processes the additional sensor data to detect other pose estimates, range estimates, and/or other position estimates using other techniques and the additional sensor data, and the vision processor 108 provides the other pose estimates, range estimates, and/or the other position estimates to the additional processor(s) 111. In this example, the vision processor 108 can provide scores (e.g., confidence scores) associated with the pose estimate, the range estimate, the position estimate, the other pose estimates, the other range estimates, the other position estimates, or a combination thereof, to the additional processor(s) 111. The additional processor(s) 111 can determine navigation for the first aircraft 102 and/or maneuver the first aircraft 102, the probe 106, or both, based on the pose estimate(s), range estimate(s), and/or the position estimate(s) to engage the probe 106 with the drogue 114 to initiate refueling of the first aircraft 102. For example, the additional processor(s) 111 can estimate a range to the drogue 114 based on the pose of the second aircraft 112 and a known geometry of the drogue 114. Alternatively, the vision processor 108 can determine the estimated pose and provide the estimated pose to the additional processor(s) 111. In some implementations, the vision processor 108 provides intermediate values to the additional processor(s) 111, and the additional processor(s) 111 determine the estimated pose, the score, and/or other information, based on the values received from the vision processor 108.

Although FIG. 1 depicts the first aircraft 102 including the sensor(s) 110, in some implementations the sensor(s) 110 are omitted or are not used to generate input to the additional processor(s) 111. For example, a pose estimate, a range estimate, and/or a position estimate may be determined solely based on thermal image data output by the thermal imaging sensor 104. Additionally, or alternatively, the vision processor 108 can perform one or more additional operations to identify or track the second aircraft 112 and/or the drogue 114, such as by using the sensor(s) 110.

The thermal imaging sensor 104 and the vision processor 108, in conjunction with other features of the first aircraft 102, improves efficiency (e.g., by reducing training costs), reliability, and repeatability of operations to mate the probe 106 and the drogue 114. For example, the vision processor 108 can process thermal image data generated by the thermal imaging sensor 104 to determine a pose of the second aircraft 112, a range between the first aircraft 102 and the second aircraft 112 and/or position of the second aircraft 112 or the drogue 114 without the cost and complexity of integrating other types of sensors in the first aircraft 102. Additionally, or in the alternative, the estimates generated by the vision processor 108 can be used to support estimates generated by other systems of the first aircraft 102, thereby improving the reliability and increasing confidence in the pose, range, and/or position estimations generated by the first aircraft 102. Such highly reliable estimates are provided without significantly increasing the cost or complexity of the first aircraft 102, as the thermal imaging sensor 104 and the vision processor 108 represent a relatively small and low-cost portion of the overall processing resources and sensors onboard the first aircraft 102. The estimates may be provided to the additional processor(s) 111, such as a guidance processor, which can mimic maneuvers performed by highly skilled human operators without the time and cost required to train the operators. Further, damage caused by improper maneuvers performed by automated aircraft or spacecraft can be reduced or eliminated by performing maneuvers that are determined based on the pose estimates, the range estimates and/or position estimates output by the vision processor 108.

Figure 2:
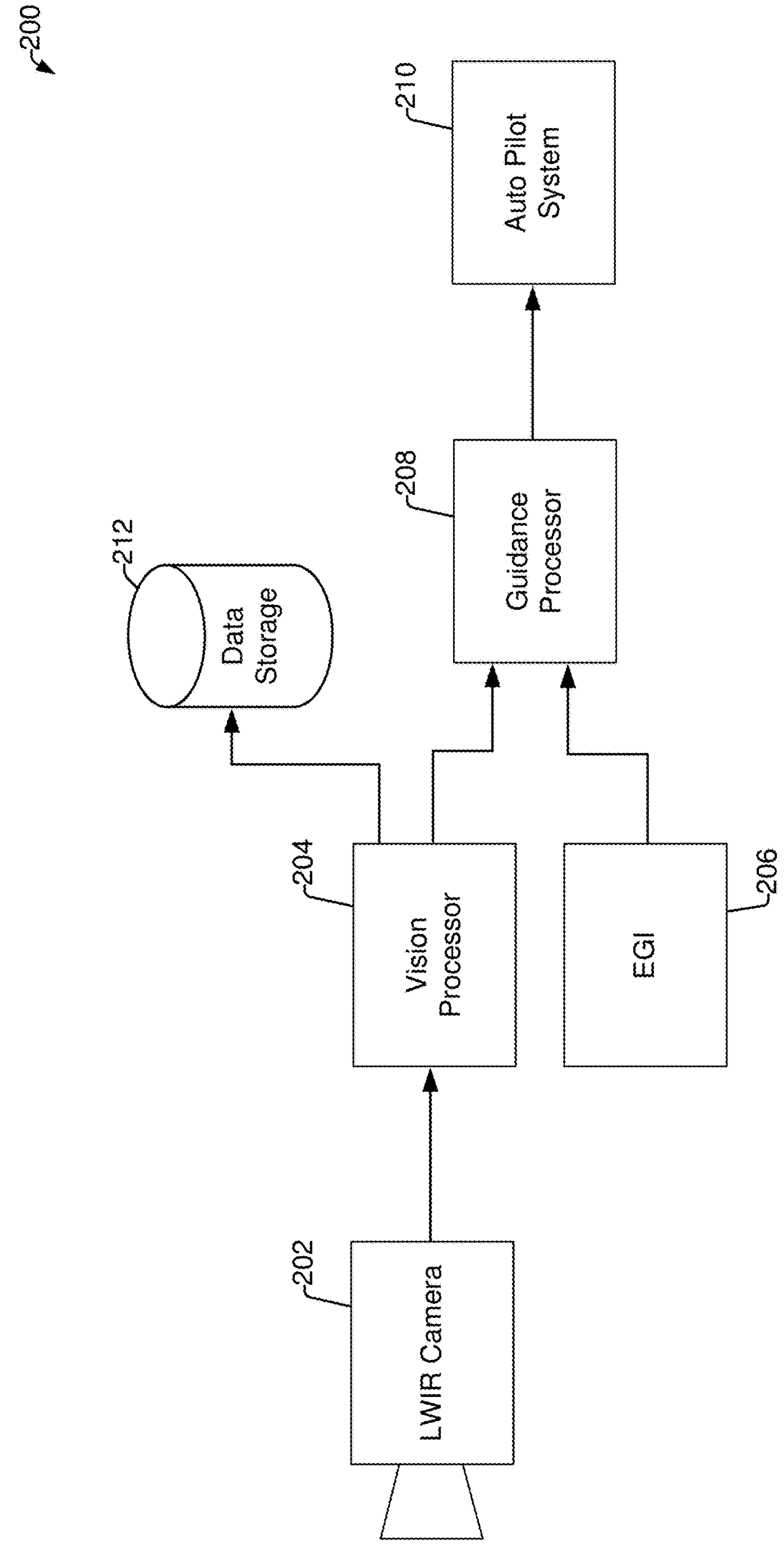
FIG. 2 is a diagram that illustrates an example of a system configured to perform thermal image-based pose tracking to mate connectors of vehicles.

FIG. 2 is a diagram that illustrates a system 200 that is configured to perform thermal image-based pose tracking to mate connectors of vehicles. The system 200 is included in one or more devices, such as an autonomous or semi-autonomous aircraft or an autonomous or semi-autonomous spacecraft. As an example, the system 200 can be included in or correspond to the first aircraft 102 of FIG. 1. In the implementation shown in FIG. 2, the system 200 includes an LWIR camera 202, a vision processor 204, an optional embedded GPS-aided inertial navigation system (EGI) 206, a guidance processor 208, an auto pilot system 210, and optional data storage 212. The LWIR camera 202 is coupled to the vision processor 204, the vision processor 204 is coupled to the guidance processor 208 and the data storage 212, the EGI 206 is coupled to the guidance processor 208, and the guidance processor 208 is coupled to the vision processor 204, the EGI 206, and the auto pilot system 210. Although illustrated as being included in the system 200 in FIG. 2, in some other implementations, the EGI 206 or data storage 212 are omitted from the system 200.

In some implementations, the LWIR camera 202 is configured to capture thermal images within a field of vision and to output thermal image data representing the thermal images to the vision processor 204. The thermal image data can depict temperature information of a captured scene, such as a portion of another aircraft or spacecraft that is within a particular range of the aircraft on which the system 200 is onboard. Although described as a LWIR camera, in other implementations, the LWIR camera 202 may additionally include, or be replaced with, any type of IR image capture device or thermal imaging device. Additionally, or alternatively, one or more other cameras, image capture devices, LED devices, or the like, may be similarly coupled to the vision processor 204 and configured to output respective image data or other types of data for use by the vision processor 204.

The vision processor 204 includes one or more processors, processor systems, CPUs, GPUs, DSPs, and/or other hardware or circuitry, such as field-programmable gate arrays (FPGAs) or application-specific integrated circuits (ASICs), that are configured to process the thermal image data from the LWIR camera 202 (and optionally other data from other sensors) to identify and track another aircraft or spacecraft (or a pose thereof) within a series of thermal images represented by the thermal image data. For example, the vision processor 204 can include or correspond to the vision processor 108. As described further herein with reference to FIGS. 3-6, the vision processor 204 can include a CPU coupled to a GPU and can perform iterative adjustments of a pose of a 3D model of another aircraft to match an outline of the 3D model to an outline of the aircraft in the thermal images, and the vision processor 204 can estimate a pose of the other aircraft relative to the aircraft in which the system 200 is onboard, which can correspond to range and position information associated with the other aircraft (e.g., if the vision processor 204 receives position data from the EGI 206 or another component of the system 200). Additionally, in some implementations, the vision processor 204 can process the thermal imaging data and/or other data to identify, track, and/or determine the pose of, range to, or position of another aircraft, or a connector of the other aircraft, using other techniques. In implementations in which the vision processor 204 determines multiple pose estimates, range estimates, position estimates, other derived values, and/or other processed thermal image data, each such estimation or value may be associated with a confidence score generated by the vision processor 204. The vision processor 204 provides the estimates, derived values, and/or processed thermal image data, and optionally the confidence scores, to the guidance processor 208 for further processing and, optionally, to the data storage 212.

The guidance processor 208 includes one or more processors, processor systems, CPUs, GPUs, DSPs, and/or other hardware or circuitry, such as FPGAs or ASICs, that are configured to process the output of the vision processor 204 and optional GPS and INS data received from the EGI 206 to determine one or more maneuvers to be performed by the aircraft on which the system 200 is onboard to cause the aircraft to mate a connector (e.g., the probe 106) with a connector (e.g., the drogue 114) of the other aircraft (e.g., the aircraft depicted in the thermal imaging data output by the LWIR camera 202). The maneuvers can include navigation directions for the aircraft, movements for a probe or other arm or boom that controls the connector for the aircraft, engine control instructions, other maneuver-related information, or a combination thereof, that when executed by the auto pilot system 210, cause the aircraft to approach the other aircraft, maintain formation flight with the other aircraft, and/or mate the connector to the corresponding connector of the other aircraft, such as during an aerial refueling operation or a docking operation between spacecraft. As a non-limiting example, the guidance processor 208 may output instructions to the auto pilot system 210 to cause the first aircraft 102 to mate the probe 106 with the drogue 114 of the second aircraft 112.

In implementations that include the data storage 212, the vision processor 204 can be configured to provide the various output (e.g., range estimate(s), position estimate(s), tracking information, processed thermal image data, etc.) to the data storage 212 for storage on the aircraft and/or transmission to another system or device. For example, the data storage 212 can include network or cloud storage that is wireless connected to the system 200 at various times. The output data from the vision processor 204 (the "vision output data") may be used to train one or more artificial intelligence (AI) or machine learning (ML) models to automatically perform operations associated with the vision processor 204, the guidance processor 208, or a combination thereof. To illustrate, the vision output data can be provided as training data to an autonomous agent (e.g., an AI or ML model) to train the autonomous agent to estimate a range to another aircraft based on input thermal imaging data. In a particular aspect, the thresholded image data (or features extracted therefrom) can be labeled with corresponding pose estimates, range estimates, corresponding confidence scores, other intermediate values, or a combination thereof, to train the autonomous agent to estimate a pose or range based on non-labeled thermal image data received as input. In another aspect, the thresholded image data (or features extracted therefrom) can be labeled with one or more maneuvers output by the guidance processor 208 to train the autonomous agent to, responsive to receiving unlabeled thermal image data, output maneuver instructions to cause the aircraft to mate the connector with the connector of the other aircraft.

In a particular implementation, the trained autonomous agent includes or corresponds to a neural network. As an example, the neural network of the trained autonomous agent is trained using one or more reinforcement learning techniques. To illustrate, during a training phase, the reinforcement learning techniques may train the neural network based in part on a reward that is determined by comparing a proposed maneuver output by the neural network to an optimum or target maneuver in particular circumstances. In this context, the optimum or target maneuver may include, for example, a shortest or least cost maneuver to mate the connectors of the aircrafts; a maneuver that mimics a maneuver performed by one or more skilled human operators under similar circumstances; a maneuver that satisfies a set of safety conditions, such as not causing any undesired contact between portions of the aircrafts; a maneuver that corresponds to maneuvering characteristics specified during or before training; or a combination thereof. As another example, during a training phase, the reinforcement learning techniques may train the neural network based in part on a reward that is determined by comparing a pose estimate, a range estimate, or a position estimate output by the neural network to a measured pose, a measured range, or a measured position of the other aircraft depicted in the thermal image data.

In some implementations, the system 200 can include a display (not shown). The display can be coupled to the LWIR camera 202, the vision processor 204, the guidance processor 208, the auto pilot system 210, or a combination thereof. The display is configured to display one or more images, a representation of one or more operations performed by the vision processor 204, one or more operations performed by guidance processor 208, one or more operations performed by the auto pilot system 210, or a combination thereof.

Figure 3:
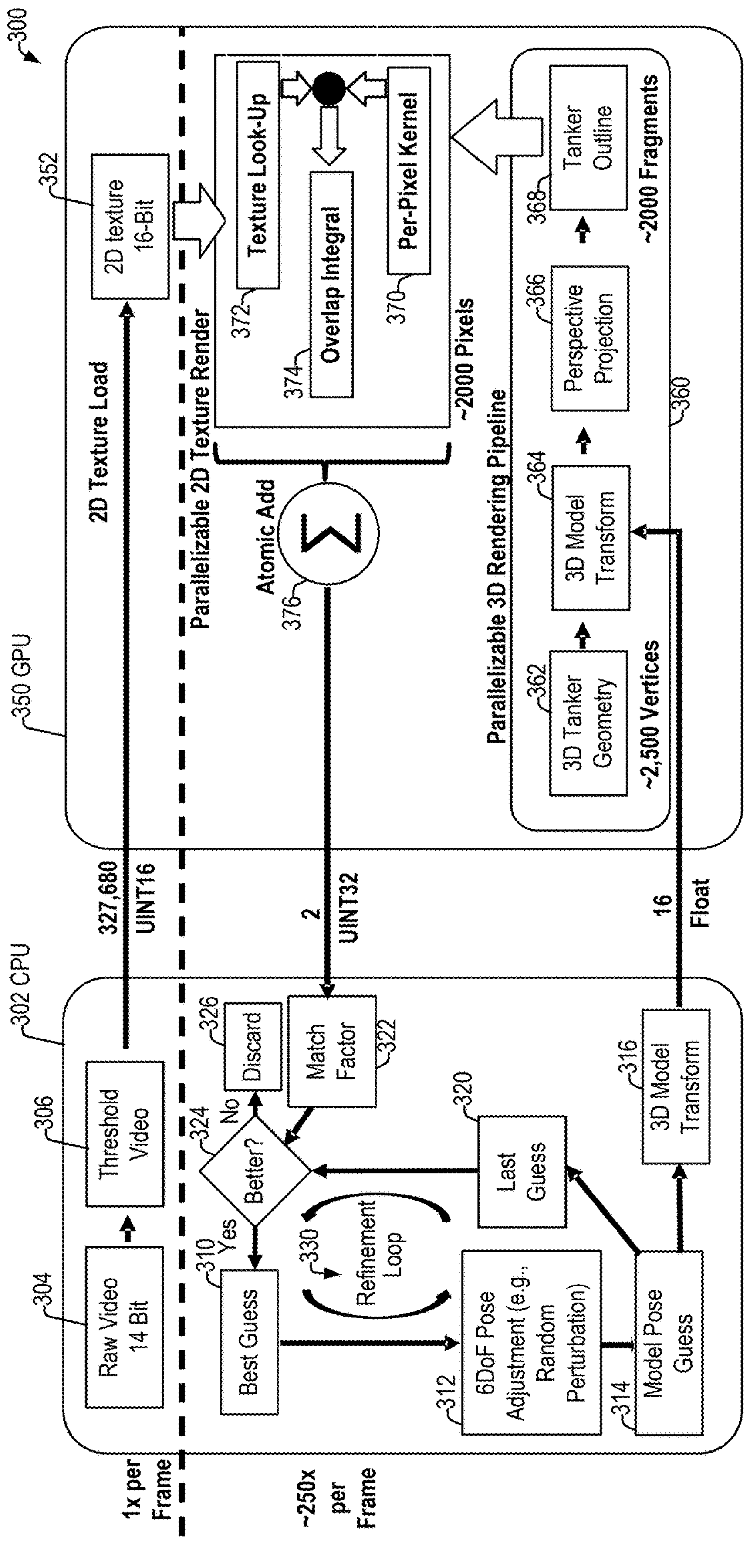
FIG. 3 depicts an example of a system including a central processing unit (CPU) and a graphics processing unit (GPU) used to perform thermal image-based pose tracking to mate connectors of vehicles.

FIG. 3 depicts an example of a system 300 that includes a CPU 302 coupled to a GPU 350 and that is used to perform thermal image-based pose tracking to mate connectors of vehicles. According to an aspect, the system 300 corresponds to a vision processor, such as the vision processor 108 of FIG. 1 or the vision processor 204 of FIG. 2. In some implementations, operations performed at the GPU 350 use an OpenGL rendering pipeline (e.g., OpenGL 4.5 as a non-limiting example).

The CPU 302 processes thermal image data, illustrated as raw video 304 of a thermal image stream, which can be generated by a thermal imaging device such as the thermal imaging sensor 104 of FIG. 1 or the LWIR camera 202 of FIG. 2. The CPU 302 processes the raw video 304, such as by removing pixels representing temperatures below a threshold, to generate threshold video 306. The threshold video 306 includes a thresholded thermal image including pixels having intensity values that satisfy (e.g., are greater than or equal to, or are greater than) the threshold. To illustrate, in the described example, the raw video 304 includes a depiction of a tanker (e.g., the second aircraft 112), and the threshold video 306 removes pixels representing the background and isolates the tanker (and any similar temperature areas). The CPU 302 provides frames of the threshold video 306 to the GPU 350 at a rate of once per frame of the raw video 304 of the thermal image stream. While raw video 304 is shown being captured by the CPU 302, in implementations that include embedded video capture hardware (not shown), the raw video 304 may be captured by that hardware and transmitted directly to the GPU 350, bypassing the CPU 302. While raw video 304 is shown as being 14 bit, the thermal video data can have any bit depth.

The GPU 350 is configured to generate outline image data, illustrated as a tanker outline 368, corresponding to a modeled outline of the tanker based on a triangulated 3D model of the tanker, illustrated as a 3D tanker geometry 362, and a pose estimate of the tanker. To illustrate, the GPU 350 renders an image of a shadow corresponding to the tanker based on the model and a pose estimate, and converts the image of the shadow into the outline image data corresponding to the modeled outline of the tanker. For example, as described further with reference to FIGS. 4-5, a parallelizable 3D rendering pipeline 360 of the GPU 350 includes a 3D model transform 364 based on 3D model transform data 316 (e.g., transformation matrices) from the CPU 302, a perspective projection 366, and generation of the tanker outline 368, such as in a stencil buffer of the GPU 350. In some implementations, prior to rendering by the parallelizable 3D rendering pipeline 360, a computer aided design (CAD) 3D model of the tanker is simplified, such as by removing elements such as internal geometry, sub-resolution features, etc., and is further simplified using 3D graphics software (e.g., Blender) to reduce the number of vertices of the 3D model, such as from over 9,000 vertices to around 2,500 vertices. One or more additional models can be applied in the parallelizable 3D rendering pipeline 360, such as a wing bending, control surface movements, and/or deformation model, for enhanced accuracy of the tanker outline 368.

The GPU 350 is configured to determine an overlap value, illustrated as a match factor 322, indicating an amount of overlap between the modeled outline and gradient data associated with the thermal image data. For example, the GPU 350 loads a frame of the threshold video 306 as a 2D texture 352 and, for each pixel of the tanker outline 368, the GPU 350 performs a texture look-up 372 and applies a per-pixel kernel 370 to only the rendered tanker outline in order to generate an overlap integral 374, such as described further with reference to FIG. 6 and in accordance with a parallelizable 3D texture render. A sum of the overlap integrals 374 for each pixel of the tanker outline 368 is generated at an add operation 376 to generate an overlap sum and outline pixel count. The overlap sum and pixel count values are provided to CPU 302; the sum is renormalized based on the pixel count to calculate the match factor 322 (also called "overlap value"), and the CPU 302 adjusts a pose estimate of the tanker based on the overlap value. Renormalization of the sum can include dividing the sum by the pixel count; alternatively, pre-scaling of the normalization factor can be performed, such as by applying a pre-division adjustment to the sum to apply a bias for larger tankers and away from convergence to a single very strong gradient pixel or region of very strong gradients. In some implementation, the match factor 322 can include a first value corresponding to overlap integrals 374 associated with a first edge direction (e.g., horizontal edges) and a second value corresponding to overlap integrals 374 associated with a second edge detection (e.g., vertical edges).

The CPU 302 is configured to perform an iterative pose estimate refinement operation, and the GPU 350 is configured to update the tanker outline 368 and determine an updated overlap value (also called "match factor" 322) in each iteration of the iterative pose estimate refinement operation. To illustrate, the iterative pose estimate refinement operation includes a refinement loop 330 in which the CPU 302 applies a 6DoF pose adjustment 312 to a "best guess" pose 310 (also referred to as "best guess 310") for the current frame of the thermal image data to generate a model pose guess 314 for the current iteration of the refinement loop 330. The best guess 310 corresponds to a "best" detected estimated pose of the tanker (e.g., the pose that generated the largest match factor 322) during prior iterations of the refinement loop 330 for the current frame. The 6DoF pose adjustment 312 can be a random perturbation (e.g., a random adjustment to one or more of an x coordinate, a y coordinate, a z coordinate, a roll, a pitch, or a yaw of the modeled tanker pose), such as a perturbation corresponding to a 6-inch translation of the tanker up or down, left or right, etc., as an illustrative, non-limiting example.

During each iterative pose refinement operation, the CPU 302 sends model transform data associated with the model pose guess 314 to the GPU 350 and receives the resulting overlap value for the model pose guess 314 from the GPU 350. To illustrate, the CPU sends the 3D model transform data 316 (e.g., transformation matrices) for the model pose guess 314 of a current iteration to the GPU 350, the GPU 350 generates the tanker outline 368 based on the 3D model transform 364, and the GPU 350 returns the match factor 322 for the model pose guess 314 of the current iteration. If the match factor 322 corresponds to a better match (e.g., a larger overlap) than the best guess 310, at a comparison 324, then the best guess 310 is updated, such as replaced with the most recent model pose guess 314, also referred to as a "last guess" 320, for the next iteration of the refinement loop 330; otherwise, the last guess 320 is discarded, at 326. At the completion of the refinement loop 330 (e.g., after a threshold number of iterations have been performed, after a rate of improvement of the match factor 322 in sequential iterations has fallen below a threshold rate, after a next frame of the raw video 304 is received, or in response to one or more other termination conditions), the best guess 310 is used as the estimated pose of the tanker for that frame. Thus, multiple iterations of the iterative pose estimate refinement operation are performed for each frame of the thermal image data to determine, for each frame of the thermal image data, an estimated pose of the tanker for the frame, and the estimated pose is associated with a largest amount of overlap determined in the multiple iterations for that frame.

Although the 6DoF pose adjustment 312 is described as a random perturbation (e.g., a downhill algorithm with random walk directions), in other implementations the 6DoF pose adjustment 312 can be based on one or more other algorithms that can increase the speed of convergence of the best guess 310. However, in an illustrative, non-limiting example, the GPU 350 can render at 15,000 frames per second to enable around 250 iterations of the refinement loop 330 to be performed per frame of the raw video 304, the tanker outline is relatively continuous, and the magnitude of the random perturbation per iteration can be appropriately sized, to reliably achieve convergence within the frame rate of the raw video 304 (e.g., a 60 Hertz (Hz) LWIR image stream) using the random perturbation, thus imposing a reduced computational load on the CPU 302 and/or loading of the memory bus between the CPU and GPU as compared to using other algorithms.

The system 300, when used in conjunction with a receiver aircraft, such as the first aircraft 102 of FIG. 1, that is outfitted with a thermal imaging device such as the thermal imaging sensor 104 of FIG. 1 or the LWIR camera 202 of FIG. 2, enables generation of a very high-confidence position estimate using a rendering pipeline of a GPU, such as the OpenGL Rendering pipeline on a modern GPU. This specifically solves the problem of tracking the other aircraft (e.g., the tanker aircraft) and providing a range estimate to the aerial refueling basket, and can be implemented without the use of artificial intelligence/machine learning in systems that allow probe and drogue aerial refueling of autonomous aircraft. Conventionally, such a solution could be provided by precision GPS; however, the described techniques can be implemented in an overall system for automated aerial refueling that could either replace GPS in limited circumstances, or provide an additional layer of safety and confidence in more typical refueling scenarios.

According to some aspects, given a rough starting point for where the tanker is expected to be located, e.g., an initial value of the best guess pose 310 for a frame, the system 300 can use hardware-based 3D rendering of a simple 2D image of the expected shadow of the 3D tanker position using OpenGL. The GPU 350 converts the image to a 2D expected tanker outline, and calculates the overlap between the expected 2D tanker outline and the gradient of the LWIR image to calculate one or more overlap scores. This is iteratively performed multiple times per incoming image frame, via the refinement loop 330, in order to track the movement of the tanker, refine the 6 degree of freedom pose, and accurately track the tanker's 3D movements.

Various aspects described above contribute to the tracking performance of the system 300, such as: using the 3D rendering power of the GPU 350 and the OpenGL framework, the thermal image information (e.g., a threshold image frame of the threshold video 306) can be sent to the GPU 350 once per incoming frame from the thermal imaging device; only the 3D model transform data 316 (e.g., transformation matrices) is sent to the GPU for each pose to be rendered; and the final overlap score is rendered to a buffer directly on the GPU 350 such that only the final scores (e.g., the match factor 322) are downloaded to the CPU 302. Such aspects reduce or minimize data transfer between the CPU 302 and the GPU 350, reducing latency associated with operation of the system 300. Additional aspects can include trying different expected poses and calculating scores for each in order to arrive at an optimized solution, and the ability to perform the described operations in real time. As a particular example, the ability to do both the rendering and the overlap scoring on the GPU 350 using custom OpenGL shaders with no need to transfer large amounts of data or do expensive context switches allows for more than 100 pose estimates (e.g., around 250 pose estimates) to be solved for each incoming frame while still maintaining real time operation on a 60 Hz LWIR image stream.

Figure 4:
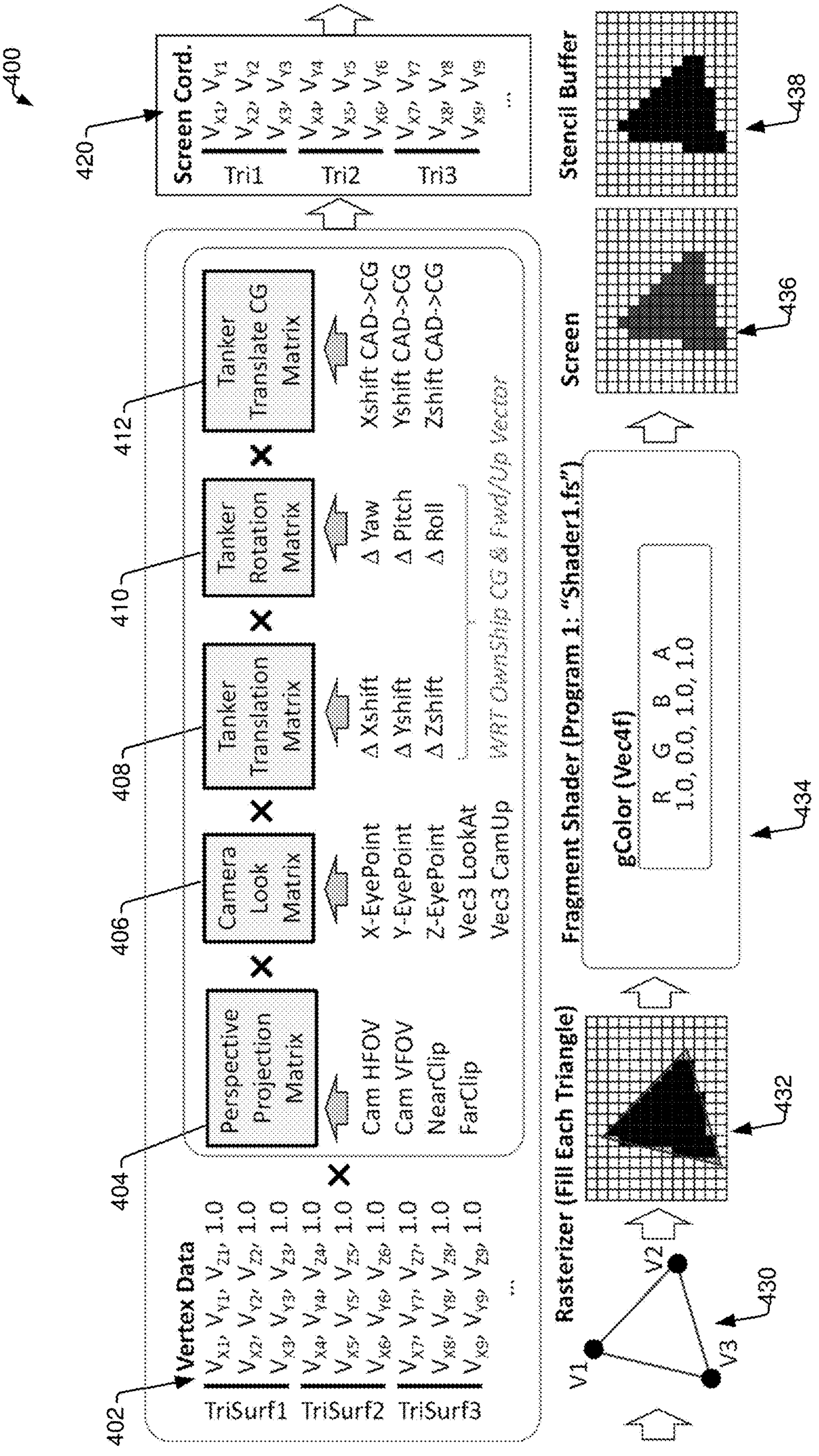
FIG. 4 depicts a first example of operations that can be used to perform thermal image-based pose tracking to mate connectors of vehicles.
Figure 5:
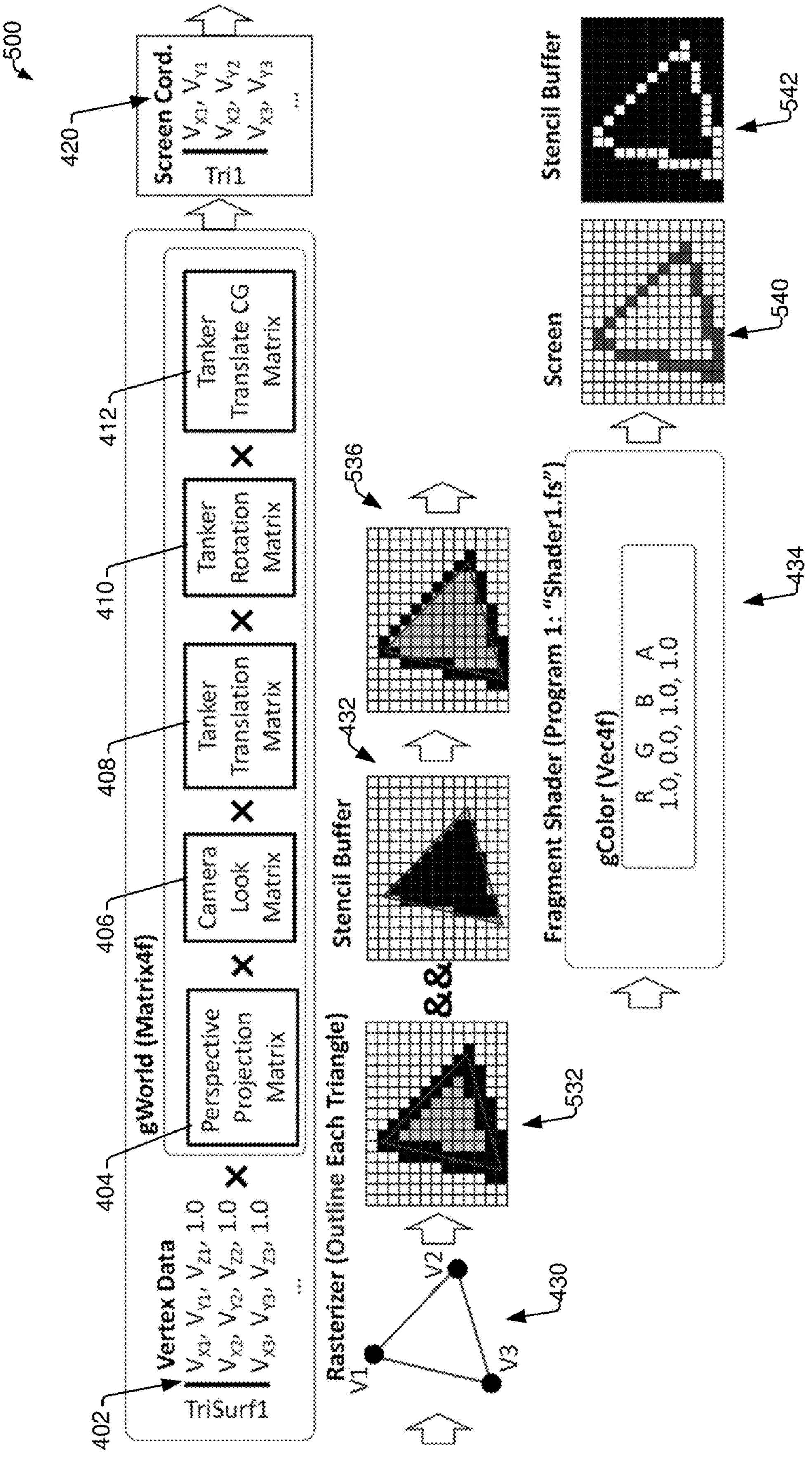
FIG. 5 depicts a second example of operations that can be used to perform thermal image-based pose tracking to mate connectors of vehicles.
Figure 6:
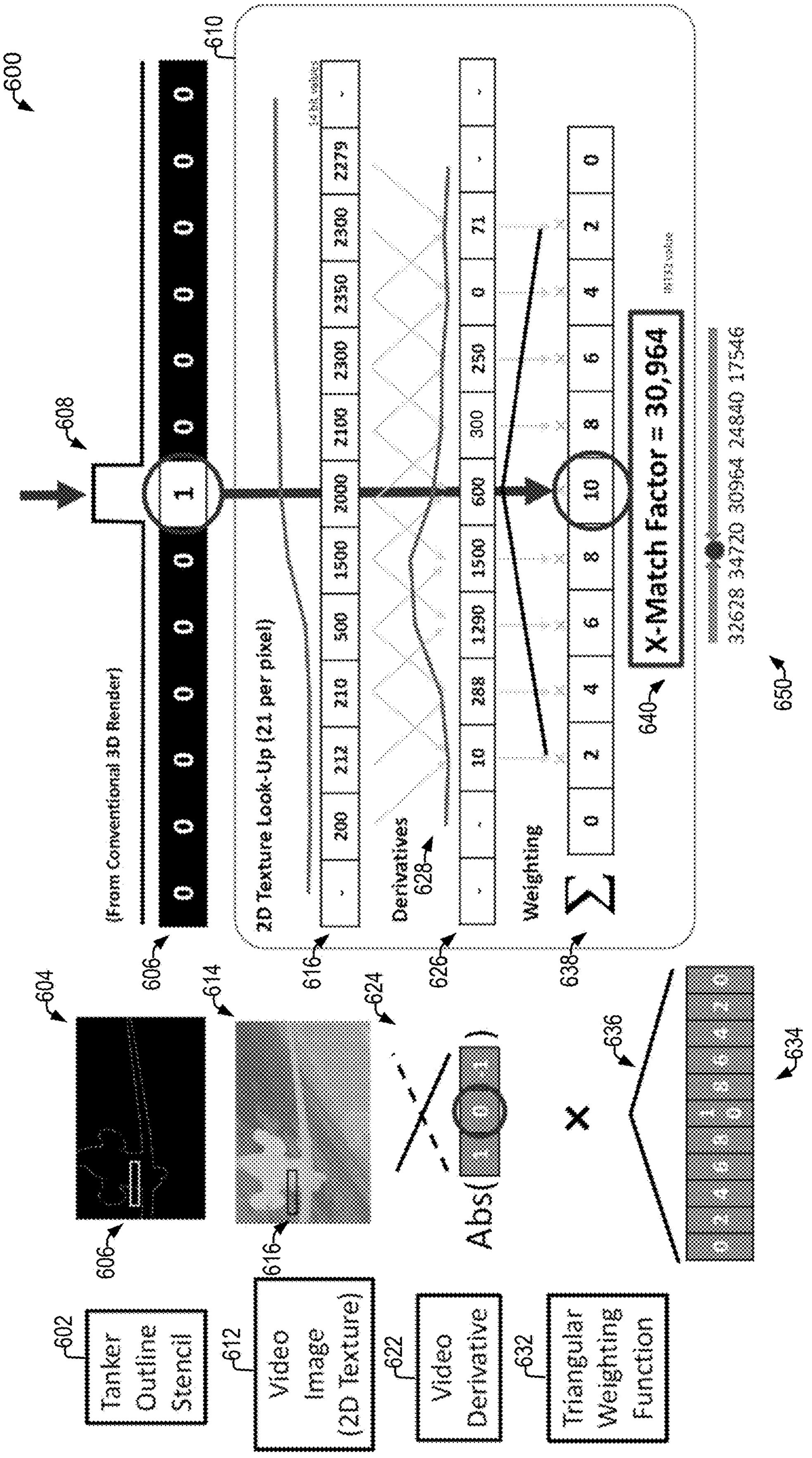
FIG. 6 depicts a third example of operations that can be used to perform thermal image-based pose tracking to mate connectors of vehicles.

FIGS. 4-6 depict examples of operations that can be used to perform thermal image-based pose tracking to mate connectors of vehicles. For example, the operations can include a first stage in which filled triangles of the 3D tanker model are rendered in the 3D rendering pipeline, as described with reference to FIG. 4, a second stage in which the triangle lines are rendered in the 3D rendering pipeline, as described with reference to FIG. 5, and a third stage in which the overlap integrals 374 are computed in a 2D texture render, as described with reference to FIG. 6.

In FIG. 4, operations 400 are depicted corresponding to the first stage in which filled triangles of the 3D model are rendered in a 3D rendering pipeline, such as the parallelizable 3D rendering pipeline 360 of FIG. 3. 3D triangle surface vertex data 402 corresponding to the triangles of the 3D tanker model (e.g., the 3D tanker geometry 362) are processed at a vertex shader that applies a perspective projection matrix 404, a camera look matrix 406, a tanker translation matrix 408, a tanker rotation matrix 410, and a tanker translate CG matrix 412 to obtain 2D screen coordinates 420 of the triangles. The 2D screen coordinates 420 of the triangles are processed at a rasterizer in which each triangle 430 is filled in to generate a filled triangle 432. The filled triangles 432 are processed at a fragment shader 434 to generate a screen representation 436 and a stencil buffer representation 438 of the triangles.

In FIG. 5, operations 500 are depicted corresponding to the second stage in which the triangle lines are rendered in the 3D rendering pipeline of FIG. 4. In the example, only a single triangle is processed, but in operation multiple triangles making up the tanker model would be processed. The operations 500 include the generation of the 2D screen coordinates 420 based on the vertex data 402 and the matrices 404-412 of FIG. 4. The screen coordinates 420 of the triangles are processed at a rasterizer in which an outline of each triangle 430 (e.g., triangle lines of width 2.0 connecting the vertices) is generated to create an outlined triangle 532, and the outlined triangles 532 are processed, such as by performing a pixel-wise logical AND operation with the white area of the stencil buffer representation 438 of the triangles, to remove portions of the outlines within the triangles (e.g., returning the intersection of the black triangle line drawing of the outlined triangles 532 and the white unmasked area of the stencil buffer representation 438 of the triangles), resulting in a representation 536 of the triangles with outer boundaries. The representation 536 is processed at a fragment shader to generate a screen representation 540 and a stencil buffer representation 542 of the remaining edges of the triangles. Only the remaining outline pixels of the screen representation 540 and the stencil buffer representation 542 are subjected to further processing.

In FIG. 6, operations 600 are depicted corresponding to the third stage in which the overlap integrals 374 are computed in a 2D texture render. The operations 600 include, for each pixel 608 of a tanker outline stencil 602 (e.g., the screen representation 540 or stencil buffer representation 542 of FIG. 5 corresponding to the modeled tanker outline 368 of FIG. 3) having a "1" value, obtaining corresponding pixel values 616 of a video image 612 (e.g., the 2D texture 352 of FIG. 3). To illustrate, for a group of pixels 606 illustrated in a graphical depiction 604 of the tanker outline stencil 602 as centered on a "1" valued pixel, a corresponding group of pixels values 616 illustrated in a graphical depiction 614 of the video image 612 are obtained via a 2D texture lookup (e.g., the texture look-up 372 of FIG. 3). Although 11 pixels are depicted for use in conjunction with a horizontal derivative kernel processing for vertical edge detection as illustrated in FIG. 6, the texture look-up can retrieve a total of 21 pixel values of the video image 612 for each 1-value pixel 608, including the video image pixel corresponding to the pixel 608, five video image pixels to the left of the pixel 608, five video image pixels to the right of the pixel 608, five video image pixels above the pixel 608, and five video image pixels below the pixel 608, to perform both vertical (Y) and horizontal (X) derivative processing.

The operations 600 include generating a video derivative 622, graphically illustrated as a kernel 624 that returns an absolute value (Abs) of the difference between a pixel value to the left of the pixel under test and a pixel value to the right of the pixel under test to approximate a magnitude of a horizontal derivative at the pixel under test. Derivative values 626 (also referred to as gradient data 626) resulting from applying the kernel 624 are illustrated and depicted in a graphical representation 628.

The operations 600 include applying a triangular weighting function 632, including, for example, 11 non-zero weight values 634 that are depicted in a graphical representation 636, by multiplying each of the weighting values 638 with a corresponding derivative value 626, and summing the resulting weighted pixel values to generate a match factor 640 (e.g., an X-match factor) that indicates how closely the location of the pixel 608 of the tanker outline stencil 602 matches a location of an outline of the tanker. A set of X-match factors 650 are illustrated showing X-match factor values that would result if the pixel 608 were instead one or two pixels to the right or left of its current location. The set of X-match factors 650 show that a local maximum of the X-match factor value occurs one pixel to the left of the pixel 608.

The X-match factor 640 and a Y-match factor (not shown) may be generated and provided as distinct values to the add operation 376, or may be combined (e.g., as a square root of the sum of the squares of the X-match factor and the Y-match factor, or as the arithmetic mean of the absolute values of the X-match factor and the Y-match factor as a computationally efficient approximation, as non-limiting examples). The operations 600 may be performed for every "1" value pixel in the tanker outline stencil 602 and the results summed by the add operation 376 to generate an overlap sum and counted to generate a pixel count, which are used to generate the global match factor 322 representing an overlap value. The global match factor 322 may be generated as a single rendered pixel whose value indicates an amount of overlap between the outline of the 3D model and the outline of the tanker in the thermal image data. In an alternate, separate X and Y-sums can be accumulated and separate X and Y-match factors can be calculated.

According to an aspect, using the triangular weighting function 632 results in fuzzy convergence that allows convergence with moderate edge misalignment, which may be beneficial when user models of the tanker have reduced precision or the starting guess is significantly far off from the correct solution. Although the operations 600 include using the +/−5 pixel triangular weighting function 632, in other implementations the triangular weighting function 632 may span fewer than or more than +/−5 pixels, such as +/−6 or more pixels, or +/−4 or fewer pixels. In some implementations, another form of weighting function may instead be used, such as a Gaussian, as an illustrative, non-limiting example.

According to an aspect, the operations described with reference to FIGS. 3-6 can be performed by a computer graphics card using standard graphic rendering libraries to track a tanker through various perspective distortion, partial obscuration, etc. just from using rendering of the tanker to find the tanker's position in space. Robust tracking is achieved without the use of keypoints (and instead using every point on the outline) and when only a portion of the tanker is imaged in the thermal image data. In an illustrative, non-limiting example, even when only about ⅔ of the tanker is imaged in the thermal image data, the present techniques enable estimation of the tanker pose with sufficient confidence to use a suitable house model to estimate the location of the drogue 114 (e.g., the drogue basket).

Figure 7:
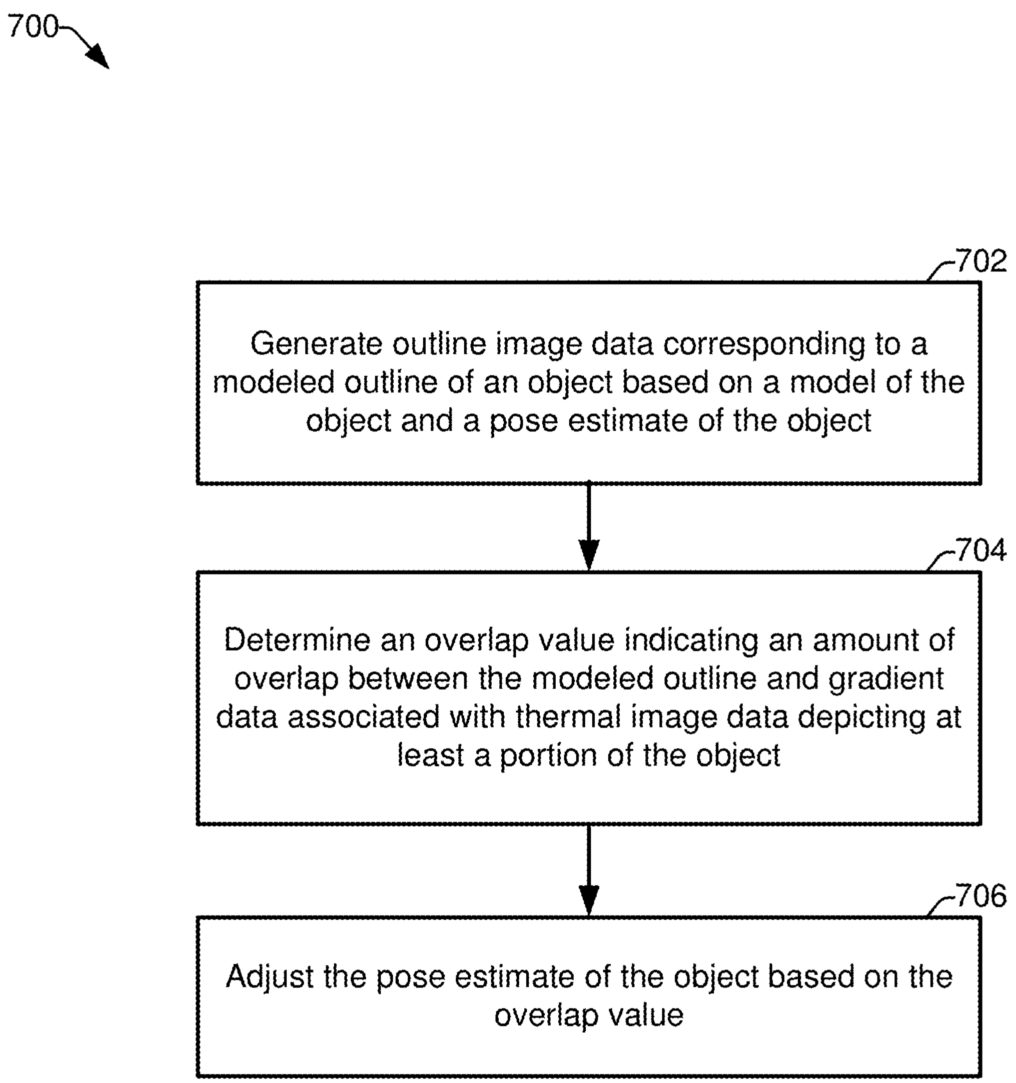
FIG. 7 is a diagram that illustrates a flow chart of an example of a method of performing thermal image-based pose tracking to mate connectors.

FIG. 7 is a flowchart that illustrates an example of a method 700 of performing thermal image-based pose tracking to mate connectors according to one or more aspects of the present disclosure. The method 700 can be initiated, performed, or controlled by one or more processors executing instructions, or by circuitry configured to cause performance of one or more operations, such as the CPU 302, the GPU 350, or both, that resides within the vision processor 108 of FIG. 1, the vision processor 204 of FIG. 2, or a combination thereof.

The method 700 includes, at block 702, generating outline image data corresponding to a modeled outline of an object based on a model of the object and a pose estimate of the object. For example, the vision processor 108 of FIG. 1 or the vision processor 204 of FIG. 2 can include the system 300 that generates the tanker outline 368 of FIG. 3 or the tanker outline stencil 602 of FIG. 6.

The method 700 includes, at block 704, determining an overlap value indicating an amount of overlap between the modeled outline and gradient data associated with thermal image data depicting at least a portion of the object. For example, the thermal image data can be obtained from the thermal imaging sensor 104 of FIG. 1 or the LWIR camera 202 of FIG. 2 and can be received by the vision processor 108 of FIG. 1 or the vision processor 204 of FIG. 2, and may correspond to the raw video 304 of FIG. 3. The overlap value can correspond to the match factor 322 generated by the GPU 350 of FIG. 3 based on an amount of overlap between the pixels of the tanker outline stencil 602 and the gradient data 626 of FIG. 6. The method 700 includes, at block 706, adjusting the pose estimate of the object based on the overlap value. For example, the CPU 302 of FIG. 3 adjusts best guess 310 based on comparisons of values of the match factor 322 for various iterations of the refinement loop 330.

In some implementations, the method 700 can include more, fewer, and/or different steps without departing from the scope of the subject disclosure. The method 700 can be implemented to realize one or more of the technical advantages described in more detail above.

Figure 8:
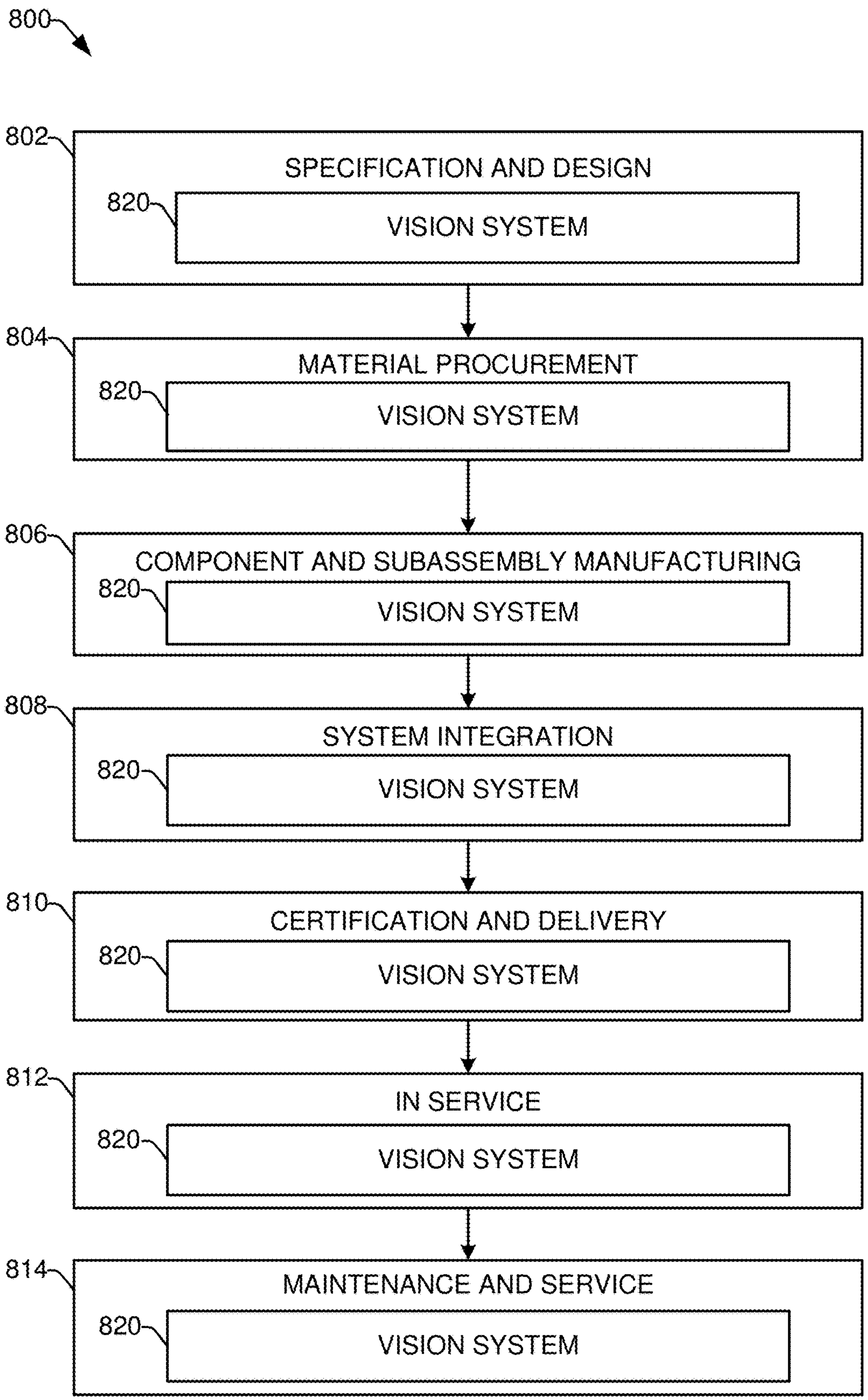
FIG. 8 is a flowchart illustrating an example of a life cycle of an aircraft including a vision system configured to perform thermal image-based pose tracking to mate connectors of vehicles.

Referring to FIG. 8, a flowchart illustrative of an example of a life cycle of an aircraft that includes a vision system configured to perform thermal image-based pose tracking to mate connectors of vehicles is shown and designated 800. During pre-production, the exemplary method 800 includes, at 802, specification and design of an aircraft, such as the first aircraft 102 described with reference to FIG. 1. During specification and design of the aircraft, the method 800 can include specification and design of a vision system 820 that is configured to perform thermal image-based pose tracking to mate connectors of vehicles. The vision system 820 may include one or more components of the system 100 of FIG. 1 (e.g., the thermal imaging sensor 104, the vision processor 108, and/or the one or more additional processor(s) 111), the system 200 of FIG. 2, and/or the system 300 of FIG. 3 (e.g., the CPU 302 and/or the GPU 350). At 804, the method 800 includes material procurement, which can include procuring materials for the vision system 820.

During production, the method 800 includes, at 806, component and subassembly manufacturing and, at 808, system integration of the aircraft. For example, the method 800 can include component and subassembly manufacturing of the vision system 820 and system integration of the vision system 820. At 810, the method 800 includes certification and delivery of the aircraft and, at 812, placing the aircraft in service. Certification and delivery can include certification of the vision system 820 to place the vision system 820 in service. While in service by a customer, the aircraft can be scheduled for routine maintenance and service (which can also include modification, reconfiguration, refurbishment, and so on). At 814, the method 800 includes performing maintenance and service on the aircraft, which can include performing maintenance and service on the vision system 820.

Each of the processes of the method 800 can be performed or carried out by a system integrator, a third party, and/or an operator (e.g., a customer). For the purposes of this description, a system integrator can include without limitation any number of aircraft manufacturers and major-system subcontractors; a third party can include without limitation any number of venders, subcontractors, and suppliers; and an operator can be an airline, leasing company, military entity, service organization, and so on.

Figure 9:
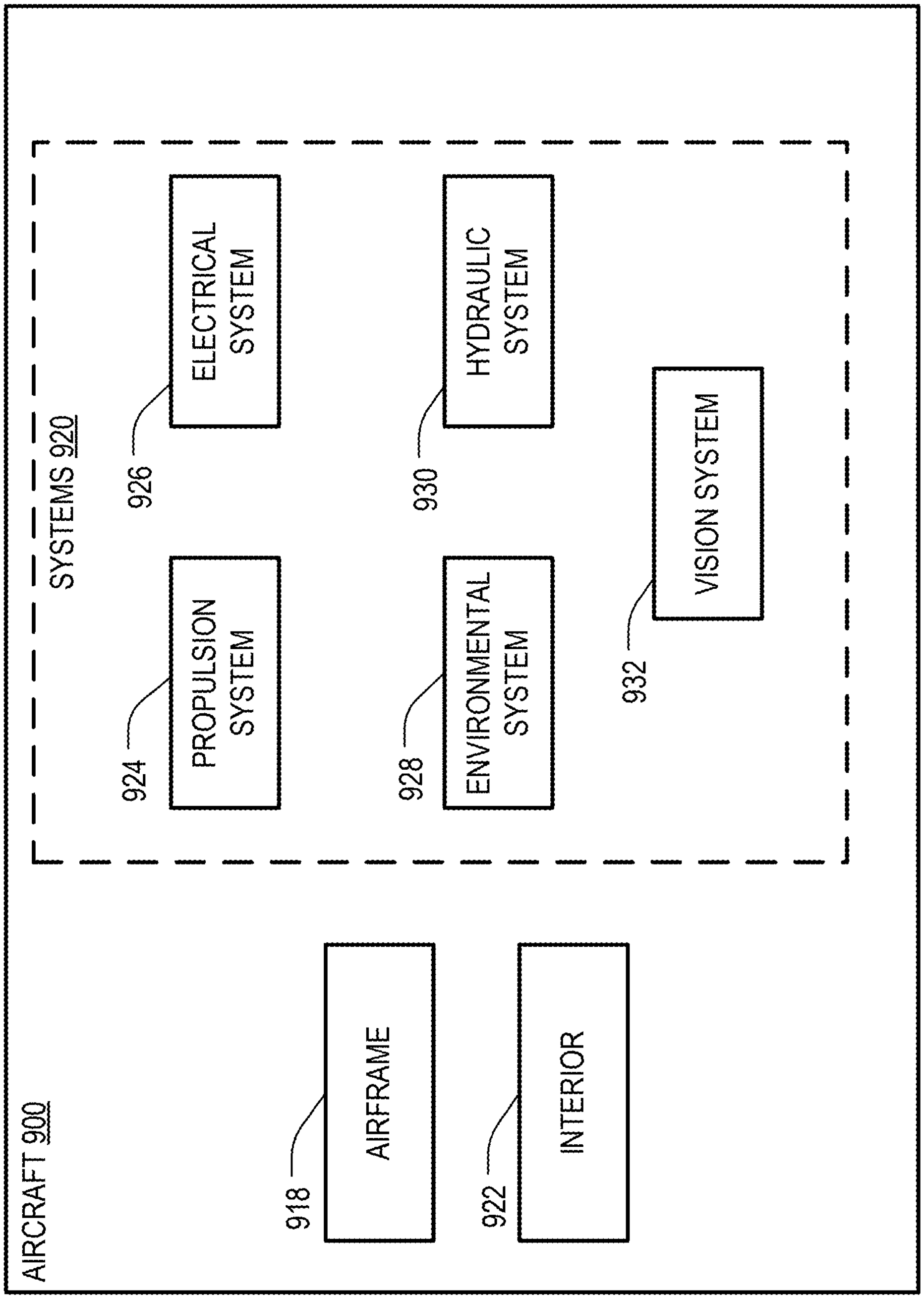
FIG. 9 is a block diagram of a particular implementation of the aircraft associated with the life cycle of FIG. 8.

Aspects of the disclosure can be described in the context of an example of a vehicle. A particular example of a vehicle is an aircraft 900 as shown in FIG. 9. The aircraft 900 can be a drone aircraft or any type of autonomous or semi-autonomous aircraft or spacecraft. In the example of FIG. 9, the aircraft 900 includes an airframe 918 with a plurality of systems 920 and an interior 922. Examples of the plurality of systems 920 include one or more of a propulsion system 924, an electrical system 926, an environmental system 928, a hydraulic system 930, and a vision system 932. Any number of other systems can be included and/or one or more of the systems depicted in FIG. 9 may be omitted. In the example of FIG. 9, the vision system 932 is configured to provide thermal image-based pose tracking functionality to mate connectors of vehicles and can include or correspond to the system 100 of FIG. 1, the system 200 of FIG. 2, the system 300 of FIG. 3, the vision system 820 of FIG. 8, or any combination thereof.

Figure 10:
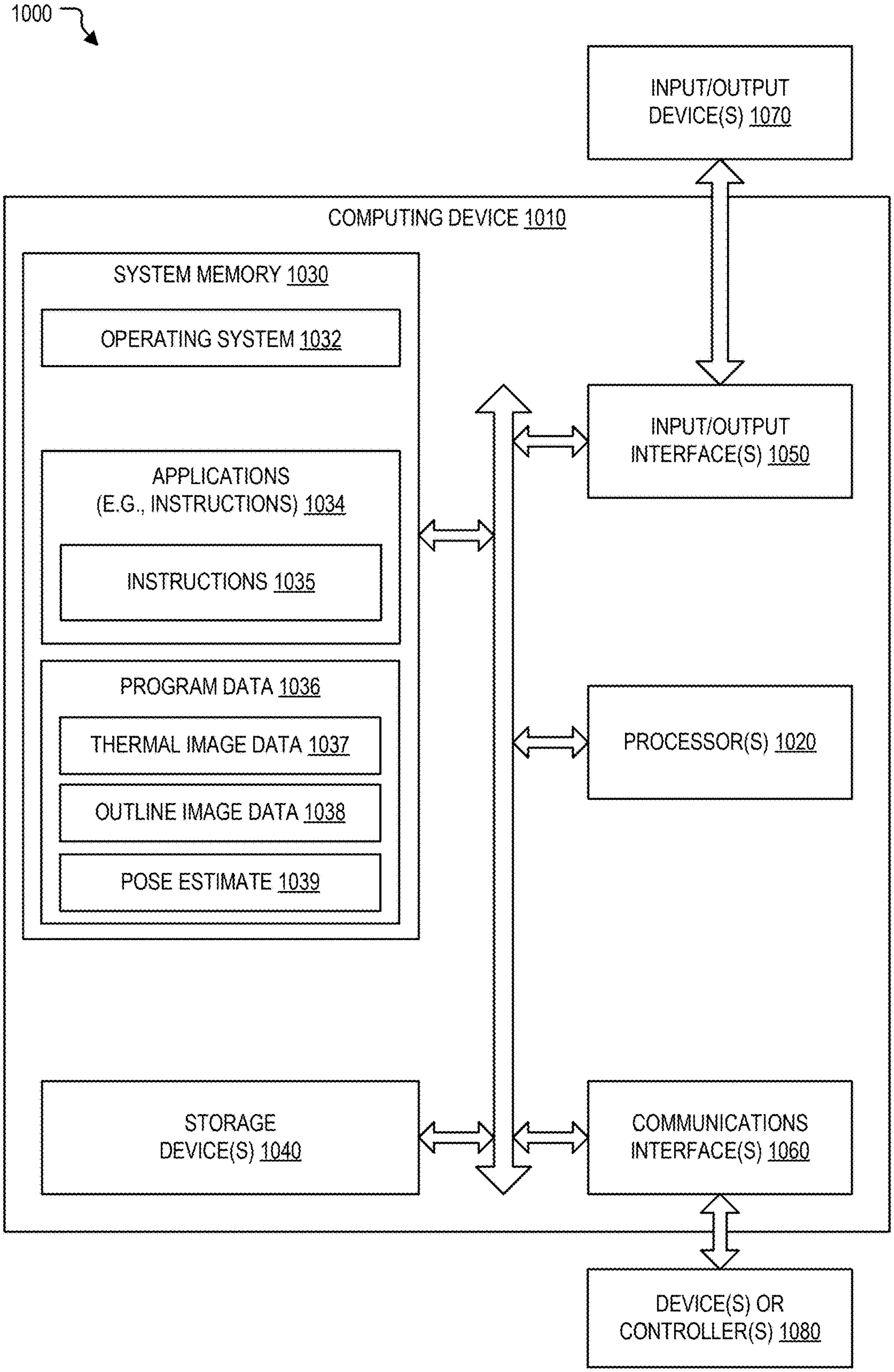
FIG. 10 is a block diagram of a computing environment including a computing device configured to support aspects of computer-implemented methods and computer-executable program instructions (or code) according to the present disclosure.

FIG. 10 is a block diagram of a computing environment 1000 including a computing device 1010 configured to support aspects of computer-implemented methods and computer-executable program instructions (or code) according to the present disclosure. For example, the computing device 1010, or portions thereof, is configured to execute instructions to initiate, perform, or control one or more operations described with reference to FIGS. 1-9.

The computing device 1010 includes one or more processors 1020. The processor(s) 1020 are configured to communicate with system memory 1030, one or more storage devices 1040, one or more input/output interfaces 1050, one or more communications interfaces 1060, or any combination thereof. The system memory 1030 includes volatile memory devices (e.g., random access memory (RAM) devices), nonvolatile memory devices (e.g., read-only memory (ROM) devices, programmable read-only memory, and flash memory), or both. The system memory 1030 stores an operating system 1032, which can include a basic input/output system for booting the computing device 1010 as well as a full operating system to enable the computing device 1010 to interact with users, other programs, and other devices. The system memory 1030 stores system (program) data 1036, such as thermal image data 1037, outline image data 1038, a pose estimate 1039, or a combination thereof. The thermal image data 1037 can include or correspond to thermal image data generated by the thermal imaging sensor 104 of FIG. 1 or the LWIR camera 202 of FIG. 2. The outline image data 1038 can include or correspond to outline image data generated by a GPU and that corresponds to a modeled outline of a vehicle, such as the tanker outline 368 of FIG. 3. The pose estimate 1039 can include or correspond to a pose estimate generated by the vision processor 108 of FIG. 1 or the vision processor 204 of FIG. 2, such as the best guess 310 of FIG. 3.

The system memory 1030 includes one or more applications 1034 (e.g., sets of instructions) executable by the processor(s) 1020. As an example, the one or more applications 1034 include instructions executable by the processor(s) 1020 to initiate, control, or perform one or more operations described with reference to FIGS. 1-10. To illustrate, the one or more applications 1034 include instructions 1035 executable by the processor(s) 1020 to initiate, control, or perform one or more operations described with reference to the vision processor 108 of FIG. 1, the vision processor 204 of FIG. 2, the CPU 302, the GPU 350, or a combination thereof.

In a particular implementation, the system memory 1030 includes a non-transitory, computer readable medium storing the instructions 1035 that, when executed by the processor(s) 1020, cause the processor(s) 1020 to initiate, perform, or control operations to perform thermal image-based pose tracking functionality to mate connectors. The operations include generating outline image data corresponding to a modeled outline of an object based on a model of the object and a pose estimate of the object. The operations include determining an overlap value indicating an amount of overlap between the modeled outline and gradient data associated with thermal image data depicting at least a portion of the object. The operations also include adjusting the pose estimate of the object based on the overlap value.

The one or more storage devices 1040 include nonvolatile storage devices, such as magnetic disks, optical disks, or flash memory devices. In a particular example, the storage devices 1040 include both removable and non-removable memory devices. The storage devices 1040 are configured to store an operating system, images of operating systems, applications (e.g., one or more of the applications 1034), and program data (e.g., the system program data 1036). In a particular aspect, the system memory 1030, the storage devices 1040, or both, include tangible computer-readable media. In a particular aspect, one or more of the storage devices 1040 are external to the computing device 1010.

The one or more input/output interfaces 1050 enable the computing device 1010 to communicate with one or more input/output devices 1070 to facilitate user interaction. For example, the one or more input/output interfaces 1050 can include a display interface, an input interface, or both. For example, the input/output interface 1050 is adapted to receive input from a user, to receive input from another computing device, or a combination thereof. In some implementations, the input/output interface 1050 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1070 includes one or more user interface devices and displays, including some combination of buttons, keyboards, pointing devices, displays, speakers, microphones, touch screens, and other devices.

The processor(s) 1020 are configured to communicate with devices or controllers 1080 via the one or more communications interfaces 1060. For example, the one or more communications interfaces 1060 can include a network interface. The devices or controllers 1080 can include, for example, a controller for the probe 106, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions can be executable to implement one or more of the operations or methods of FIGS. 1-10. In some implementations, part or all of one or more of the operations or methods of FIGS. 1-10 can be implemented by one or more processors (e.g., one or more central processing units (CPUs), one or more graphics processing units (GPUs), one or more digital signal processors (DSPs), one or more field-programmable gate arrays (FPGAs), or one or more application-specific integrated circuits (ASICs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Aspects of the disclosure are described further with reference to the following set of interrelated examples:

According to Example 1, a device includes a thermal imaging sensor configured to generate thermal image data depicting at least a portion of an object; and a vision processor coupled to the thermal imaging sensor. The vision processor is configured to generate outline image data corresponding to a modeled outline of the object based on a model of the object and a pose estimate of the object; determine an overlap value indicating an amount of overlap between the modeled outline and gradient data associated with the thermal image data; and adjust the pose estimate of the object based on the overlap value.

Example 2 includes the device of Example 1, wherein the vision processor is configured to update the outline image data and determine an updated overlap value in each iteration of an iterative pose estimate refinement operation.

Example 3 includes the device of Example 1 or Example 2, wherein multiple iterations of the iterative pose estimate refinement operation are performed for each frame of the thermal image data to determine, for each frame of the thermal image data, an estimated pose of the object, the estimated pose associated with a largest amount of overlap determined in the multiple iterations for that frame.

Example 4 includes the device of any of Examples 1 to 3, wherein the vision processor includes a central processing unit (CPU) coupled to a graphics processing unit (GPU); the CPU is configured to send, to the GPU, model transform data associated with the pose estimate; and the GPU is configured to generate the outline image data at least partially based on the model transform data.

Example 5 includes the device of Example 4, wherein the GPU is further configured to determine overlap sum and pixel count values; and send the overlap sum and pixel count values to the CPU.

Example 6 includes the device of any of Examples 1 to 5, wherein, during generation of the outline image data, the vision processor is configured to render, based on the model and the pose estimate, an image corresponding to the outline image data corresponding to the modeled outline of the object.

Example 7 includes the device of any of Examples 1 to 6, wherein the vision processor is configured to, for each pixel of the modeled outline, determine a corresponding match factor based on a weighted sum of corresponding pixel values of the gradient data.

Example 8 includes the device of Example 7, wherein the overlap value is generated based on a sum of the match factors and a count of pixels in the modeled outline.

Example 9 includes the device of any of Examples 1 to 8, and further includes a guidance processor configured to receive the pose estimate from the vision processor and, based on the pose estimate, determine and initiate performance of maneuvers to mate a first connector of a first aircraft to a second connector of the object.

Example 10 includes the device of any of Examples 1 to 9, wherein the object corresponds to a vehicle.

According to Example 11, a method includes generating, at a processor, outline image data corresponding to a modeled outline of an object based on a model of the object and a pose estimate of the object; determining, at the processor, an overlap value indicating an amount of overlap between the modeled outline and gradient data associated with thermal image data depicting at least a portion of the object; and adjusting, at the processor, the pose estimate of the object based on the overlap value.

Example 12 includes the method of Example 11, and further includes updating the outline image data and determining an updated overlap value in each iteration of an iterative pose estimate refinement operation.

Example 13 includes the method of Example 11 or Example 12, and further includes performing multiple iterations of the iterative pose estimate refinement operation for each frame of the thermal image data to determine, for each frame of the thermal image data, an estimated pose of the object, the estimated pose associated with a largest amount of overlap determined in the multiple iterations for that frame.

Example 14 includes the method of any of Examples 11 to 13, and further includes sending, from a central processing unit (CPU) of the processor to a graphics processing unit (GPU) of the processor, model transform data associated with the pose estimate; and generating, at the GPU, the outline image data at least partially based on the model transform data.

Example 15 includes the method of Example 14, and further includes determining, at the GPU, overlap sum and pixel count values; and sending the overlap sum and pixel count values to the CPU.

Example 16 includes the method of any of Examples 11 to 15, wherein generating the outline image data includes rendering, based on the model and the pose estimate, an image corresponding to the outline image data corresponding to the modeled outline of the object.

Example 17 includes the method of any of Examples 11 to 16, and further includes, for each pixel of the modeled outline, determining a corresponding match factor based on a weighted sum of corresponding pixel values of the gradient data.

Example 18 includes the method of Example 17, wherein the overlap value is generated based on a sum of the match factors and a count of pixels in the modeled outline.

Example 19 includes the method of any of Examples 11 to 18, and further includes determining and initiating performance of maneuvers, based on the pose estimate, to mate a first connector of a first aircraft to a second connector of the object.

Example 20 includes the method of any of Examples 11 to 19, wherein the object corresponds to a vehicle.

According to Example 21, a non-transitory, computer-readable medium storing instructions that, when executed by one or more processors, cause the one or more processors to perform operations including: generating outline image data corresponding to a modeled outline of an object based on a model of the object and a pose estimate of the object; determining an overlap value indicating an amount of overlap between the modeled outline and gradient data associated with thermal image data depicting at least a portion of the object; and adjusting the pose estimate of the object based on the overlap value.

Example 22 includes the non-transitory, computer-readable medium of Example 21, wherein the one or more processors include a central processing unit (CPU) and a graphics processing unit (GPU), and the operations further include: sending, from the CPU to the GPU, model transform data associated with the pose estimate; generating, at the GPU, the outline image data at least partially based on the model transform data; determining, at the GPU, overlap sum and pixel count values; and sending, from the GPU to the CPU, the overlap sum and pixel count values to the CPU.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:

a thermal imaging sensor configured to generate thermal image data depicting at least a portion of an object; and a vision processor coupled to the thermal imaging sensor, wherein the vision processor is configured to:

generate outline image data corresponding to a modeled outline of the object based on a model of the object and a pose estimate of the object;

determine an overlap value indicating an amount of overlap between the modeled outline and gradient data associated with the thermal image data; and adjust the pose estimate of the object based on the overlap value.

2. The device of claim 1, wherein the vision processor is configured to update the outline image data and determine an updated overlap value in each iteration of an iterative pose estimate refinement operation.

3. The device of claim 2, wherein multiple iterations of the iterative pose estimate refinement operation are performed for each frame of the thermal image data to determine, for each frame of the thermal image data, an estimated pose of the object, the estimated pose associated with a largest amount of overlap determined in the multiple iterations for that frame.

4. The device of claim 1, wherein:

the vision processor includes a central processing unit (CPU) coupled to a graphics processing unit (GPU);

the CPU is configured to send, to the GPU, model transform data associated with the pose estimate; and the GPU is configured to generate the outline image data at least partially based on the model transform data.

5. The device of claim 4, wherein the GPU is further configured to:

determine overlap sum and pixel count values; and send the overlap sum and pixel count values to the CPU.

6. The device of claim 1, wherein, during generation of the outline image data, the vision processor is configured to:

render, based on the model and the pose estimate, an image corresponding to the outline image data corresponding to the modeled outline of the object.

7. The device of claim 1, wherein the vision processor is configured to, for each pixel of the modeled outline, determine a corresponding match factor based on a weighted sum of corresponding pixel values of the gradient data.

8. The device of claim 7, wherein the overlap value is generated based on a sum of the match factors and a count of pixels in the modeled outline.

9. The device of claim 1, wherein the object corresponds to a vehicle, and further comprising a guidance processor configured to receive the pose estimate from the vision processor and, based on the pose estimate, determine and initiate performance of maneuvers to mate a first connector of a first aircraft to a second connector of the vehicle.

10. A method comprising:

generating, at a processor, outline image data corresponding to a modeled outline of an object based on a model of the object and a pose estimate of the object;

determining, at the processor, an overlap value indicating an amount of overlap between the modeled outline and gradient data associated with thermal image data depicting at least a portion of the object; and adjusting, at the processor, the pose estimate of the object based on the overlap value.

11. The method of claim 10, further comprising updating the outline image data and determining an updated overlap value in each iteration of an iterative pose estimate refinement operation.

12. The method of claim 11, further comprising performing multiple iterations of the iterative pose estimate refinement operation for each frame of the thermal image data to determine, for each frame of the thermal image data, an estimated pose of the object, the estimated pose associated with a largest amount of overlap determined in the multiple iterations for that frame.

13. The method of claim 10, further comprising:

sending, from a central processing unit (CPU) of the processor to a graphics processing unit (GPU) of the processor, model transform data associated with the pose estimate; and generating, at the GPU, the outline image data at least partially based on the model transform data.

14. The method of claim 13, further comprising:

determining, at the GPU, overlap sum and pixel count values; and sending the overlap sum and pixel count values to the CPU.

15. The method of claim 10, wherein generating the outline image data includes rendering, based on the model and the pose estimate, an image corresponding to the outline image data corresponding to the modeled outline of the object.

16. The method of claim 10, further comprising, for each pixel of the modeled outline, determining a corresponding match factor based on a weighted sum of corresponding pixel values of the gradient data.

17. The method of claim 16, wherein the overlap value is generated based on a sum of the match factors and a count of pixels in the modeled outline.

18. The method of claim 10, wherein the object corresponds to a vehicle, and further comprising determining and initiating performance of maneuvers, based on the pose estimate, to mate a first connector of a first aircraft to a second connector of the vehicle.

19. A non-transitory, computer-readable medium storing instructions that, when executed by one or more processors, cause the one or more processors to perform operations including:

generating outline image data corresponding to a modeled outline of an object based on a model of the object and a pose estimate of the object;

determining an overlap value indicating an amount of overlap between the modeled outline and gradient data associated with thermal image data depicting at least a portion of the object; and adjusting the pose estimate of the object based on the overlap value.

20. The non-transitory, computer-readable medium of claim 19, wherein the one or more processors include a central processing unit (CPU) and a graphics processing unit (GPU), and wherein the operations further comprise:

sending, from the CPU to the GPU, model transform data associated with the pose estimate;

generating, at the GPU, the outline image data at least partially based on the model transform data;

determining, at the GPU, overlap sum and pixel count values; and sending, from the GPU to the CPU, the overlap sum and pixel count values.

* * * * *